United States Patent [19]
Lee et al.

[11] Patent Number: 6,028,442
[45] Date of Patent: Feb. 22, 2000

[54] TEST CIRCUIT FOR IDENTIFYING OPEN AND SHORT CIRCUIT DEFECTS IN A LIQUID CRYSTAL DISPLAY AND METHOD THEREOF

[75] Inventors: Gun-Won Lee; Jin-Ho Choi, both of Kyungki-do, Rep. of Korea

[73] Assignee: Samsung Electronics, Co., Ltd., Suwon, Rep. of Korea

[21] Appl. No.: 08/845,506

[22] Filed: Apr. 24, 1997

[30] Foreign Application Priority Data

Apr. 24, 1996 [KR] Rep. of Korea ............ 96-12622

[51] Int. Cl.[7] ............................................. G06F 7/02
[52] U.S. Cl. ............................... 324/770; 324/537
[58] Field of Search ................... 324/770, 537, 324/158.1

[56] References Cited

U.S. PATENT DOCUMENTS 5,546,013  8/1996  Ichioka ........................ 324/770

*Primary Examiner*—Walter E. Snow
*Attorney, Agent, or Firm*—Marger Johnson & McCollom, P.C.

[57] ABSTRACT

A liquid crystal display is modified to support exhaustive, quantitative testing after assembly while requiring only a limited number of test pads. Multiple data lines are connected to form data line blocks on-board the display but outside the active area of the array for testing purposes. Each data line block is connected to a corresponding test pad via a control switch, the control switches being preferably formed of TFTs and controlled by test gate lines arranged perpendicular to the data lines in matrix form.

21 Claims, 3 Drawing Sheets

TEST CIRCUIT FOR IDENTIFYING OPEN AND SHORT CIRCUIT DEFECTS IN A LIQUID CRYSTAL DISPLAY AND METHOD THEREOF

BACKGROUND OF THE INVENTION (1) Field of the Invention

The present invention relates to a tester and testing method for the detection of manufacturing defects produced in displays, and more particularly to a tester and testing method for the detection of open and short circuit defects in the signal lines of liquid crystal displays or the like.

(2) Description of the Related Art

Liquid crystal displays (LCDs) are becoming more and more popular and widely used in many types of electronic equipment including portable computers and portable data terminal devices. LCDs are made of a sandwich comprising upper and lower glass sheets with liquid crystal substrate sandwiched therebetween. The liquid crystal substrate typically comprise pixel electrodes for each pixel element, the pixel electrodes being arranged in an array pattern, gate lines, data lines, and thin film transistors (TFTs). As in other displays, the characters are built up from segments or dots formed from the pixel electrodes on the liquid crystal substrate.

LCDs typically undergo functional and other tests at the end of their manufacture to detect substrates having defective light segments or dots. Among the tests normally performed is an open/short circuit test to detect open and short circuits in display signal lines. Generally, the open/short circuit test measures the current or the resistance of each signal line after applying a voltage common to the signal lines. In this manner, defective LCDs are identified before being allowed to continue in the manufacturing process. The result of this testing is improved product quality and decreased overall product cost.

In addition, the completed LCD panel may be visually inspected to identify panels having malfunctioning or missing elements. Visual testing, however, is time consuming and does not provide quantitative data necessary for manufacturing process improvement.

A conventional open/short circuit tester and testing method are described below with reference to the accompanying drawings. As shown in FIG. 1, LCDs typically comprise a rectangular array or matrix having gate lines G1 to Gj running in a horizontal direction and data lines D1 to Di running at a vertical direction. Data lines D1 to Di cross gate lines G1 to Gi at predetermined intervals. At each cross point, a thin film transistor (TFT) (not shown in FIG. 1) and a pixel electrode is formed (not shown in FIG. 1). In an LCD, a picture is displayed in active area 100 comprising the rectangular array of TFTs and pixel electrodes.

In a conventional LCD, testing pads are included to facilitate testing for open and short circuits in the active area. First common pad 10 is connected to a first end of data lines D1 to Di. A plurality of testing pads 11 to 1i are connected to respective second ends of each data line d1 to Di. Likewise, a second common pad 20 is connected to a first end of gate lines G1 to Gi. A plurality of testing pads 21 to 2j are connected to a respective second ends of each gate line 21 to 2j. First common pad 10, second common pad 20, and testing pads 11 to 1i and 21 to 2j are typically located outside active area 100.

Testing for open and short circuits in the active area 100 is accomplished by probing the test pads in the following manner. A first and a second voltage is applied to first and second common pads 10 and 20, respectively, thereby applying a common first and second voltage to data lines D1 to Di and gate lines G1 to Gj, respectively. Testing pads 11 to 11i and 21 and 2j are then probed to measure the current and/or the resistance of each of the data and gate lines 11 to 1i and 21 to 2j.

The above-mentioned technique for open and short circuit testing is disadvantageous for several reasons. Testing in this manner is time consuming and costly because of the large number of testing pads involved. Moreover, as the resolution of LCDs increases, the pitch between the testing pads decreases. This, in turn, leads to a decrease in testing reliability because it is more difficult for the testing probe to make reliable contact with the testing pads.

SUMMARY OF THE INVENTION

It is an object of the present invention to provide an open/short circuit test circuit of data lines and testing method thereof which allows testing with a reduced number of testing pads and which increases testing reliability.

To achieve the above-mentioned object, according to a preferred embodiment of the present invention, an open/short circuit test circuit having a plurality of data lines, the test circuit comprising a common pad for receiving a test voltage, said data pad connected to a first end of the plurality of data lines; and a plurality of test lines, said plurality of test lines and the data lines forming a matrix outside an active area of the liquid crystal display.

To achieve the above-mentioned object, an open/short circuit testing method for a liquid crystal display having a plurality of data lines and a plurality of test lines is provided which comprises applying a test voltage to a first end of a plurality of data lines, the data lines extending outside a display active area; enabling at least one switching element from a plurality of switching elements, each switching element being coupled to a respective data and test line; and measuring a test parameter for each data line.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, wherein.

DETAILED DESCRIPTION OF THE PREFERRED EMBODIMENT(S)

Figure 1:
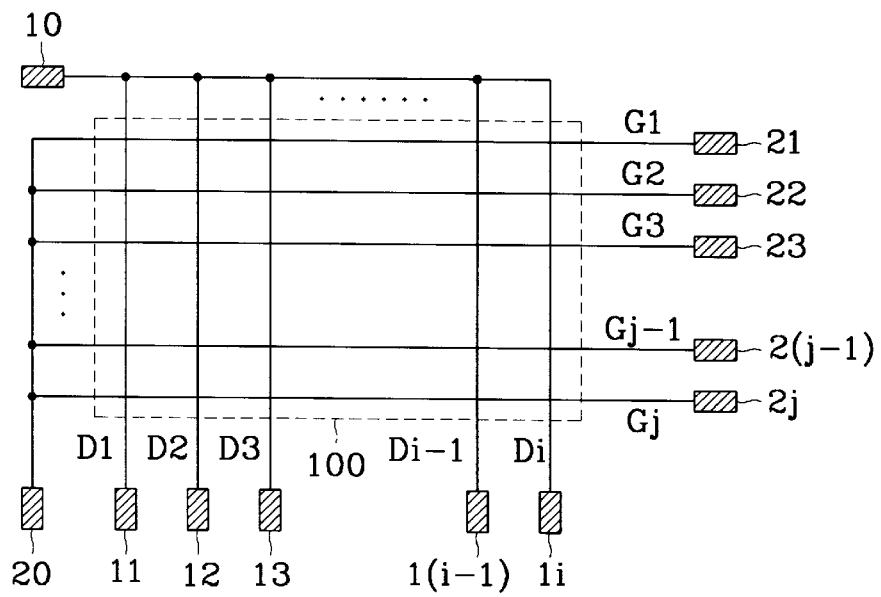
FIG. 1 is plane diagram illustrating the trace scheme used in the conventional LCD panel.
Figure 2:
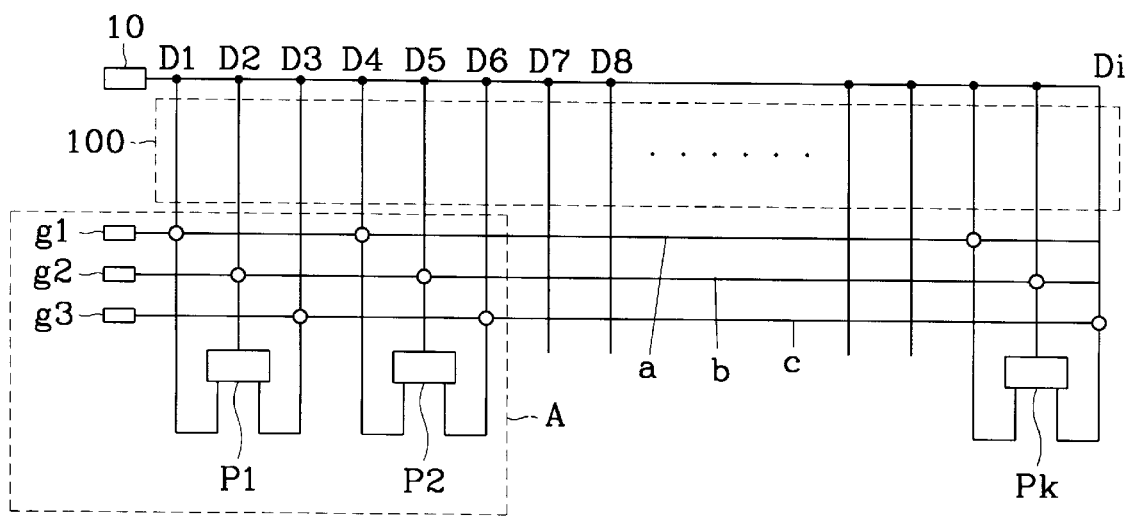
FIG. 2 is a plane diagram illustrating the trace scheme of the present invention.

FIG. 2 shows the case where three gate extra lines are added as test lines. Test lines can be added as required by the LCD and still be within the scope of the present invention. In general, a plurality of data lines D1 to Di and gate lines G1 to Gj are formed in the display active area 100 and the additional gate or test lines a, b, and c are formed alongside of active area 100.

Additional test lines a, b, and c are formed crossing data lines D1 to Di and extend outside active area 100. Data line blocks are formed by connecting three data lines crossed by test gate lines a, b, and c to a common testing pad. TFTs are formed at each gate-data line crossing. A first end of each additional test line a, b, and c is connected to control pads g1, g2, and g3, respectively.

Figure 3A:
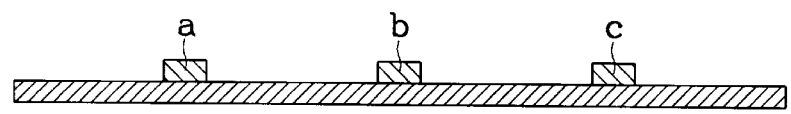
FIG. 3A to 3B are cross-sectional views of the trace scheme shown in FIG. 2.
Figure 3B:
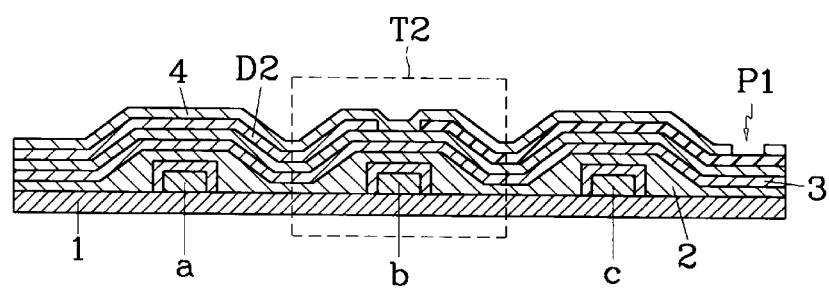

As shown in FIG. 3A and 3B, TFW T2, for example, is formed on additional test line b by the deposition-patterning of insulator layer 2, semiconductor layer 3, passivation layer 4 and data line D2, and testing pad P1 is formed by etching the passivation layer 4.

Figure 4:
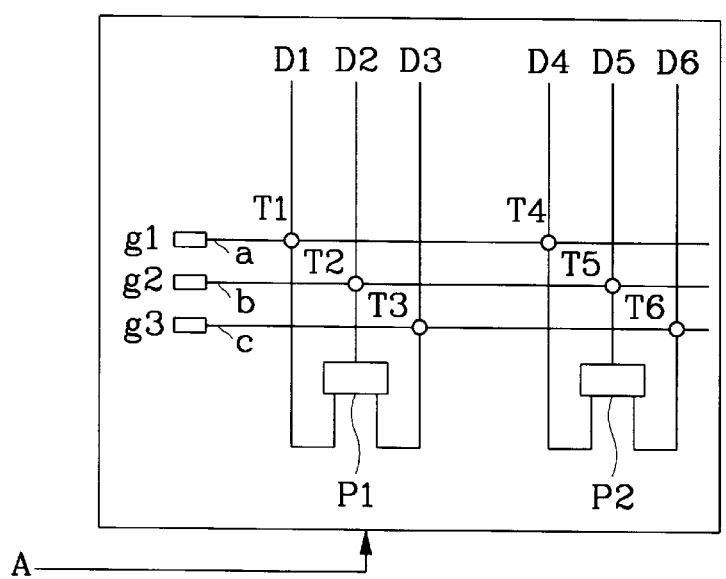
FIG. 4 is an expanded diagram of area A of FIG. 2.
Figure 5:
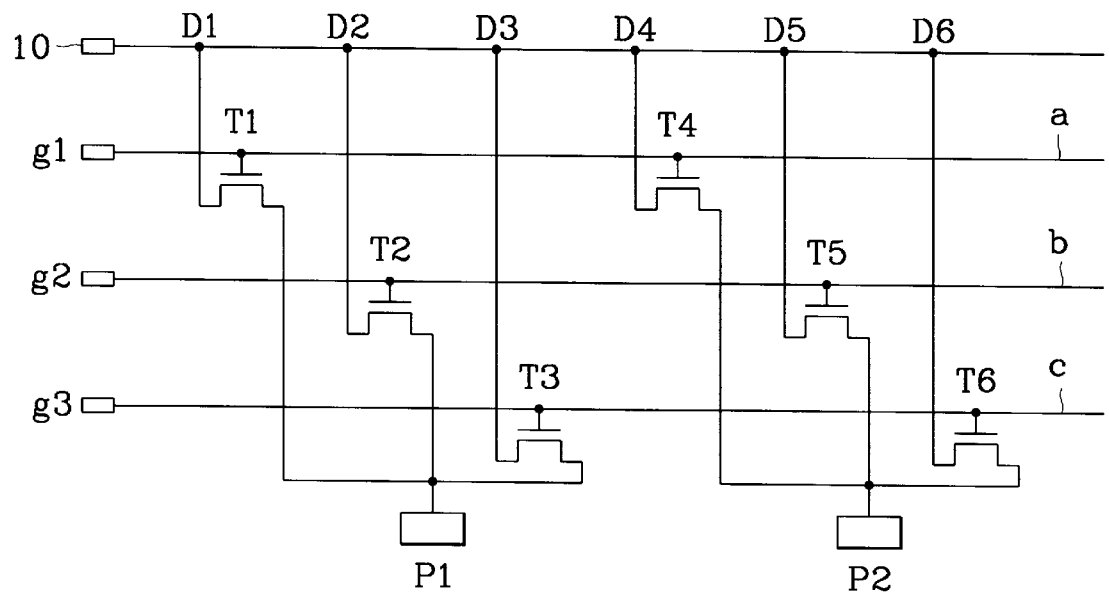
FIG. 5 is a circuit diagram of area A.

The operation of the open/short circuit tester of and testing method thereof are described with reference to FIGS. 4 and 5. A test voltage is applied to first common pad 10 which is connected to a first end of data lines D1 to Di, D1 to D6 in this example. If a control voltage is applied to additional test line a through testing pad g1, TFT T1 and T4 will be enabled, allowing a test probe (not shown) to test for open and short circuits by measuring the current flowing through TFT T1 and T4 at pads P1 and P2, respectively, or the resistance of TFT T1 and T4. The remaining data lines can be tested in the same manner. Accordingly, the number of testing pads required to test all data lines is decreased.

In this example, the total number of additional TFTs required for the additional test lines is equal to the total number of data lines. The total number NP of test pads required to test for open and short circuits is given by expression (1).

$$NP=(D/x+x+1) \quad (1)$$

where,
D is the total number of data lines;
x is the total number of the additional test lines; and
1 is the number of common pads.

Figure 6:
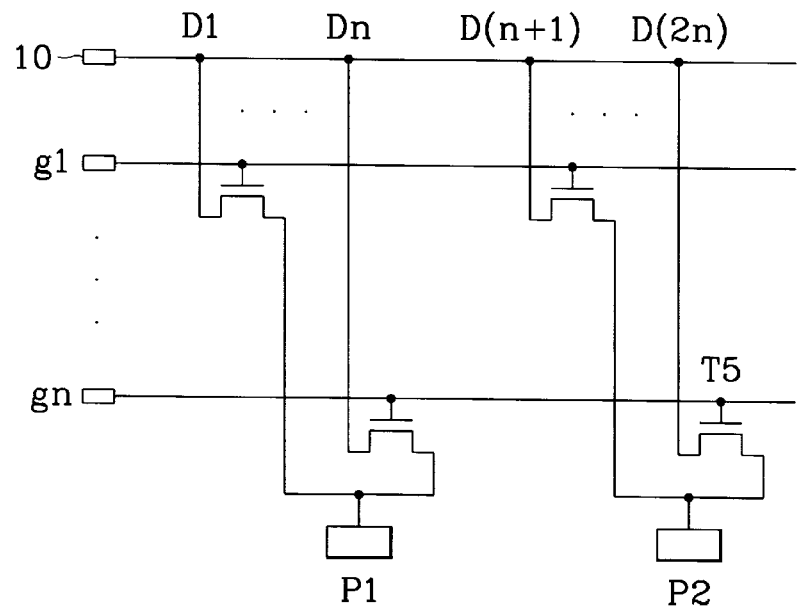
FIG. 6 is a extended diagram of the circuit shown in FIG. 5.

As shown in FIG. 6, the data lines are grouped in N blocks where N is the number of the additional test lines g1 to gn. Accordingly, the first block of data lines D1 to Dn is connected to first testing pad P1, and the second block of data lines D(n+1) to D(2n) is connected to second testing pad P2. Therefore, data lines D1, D(n+1), and D(2n+1) can be tested by first additional test line g1, and data lines D(n), D(2n), D(3n), and D(mn) (where m and n are integer numbers) can be tested by nth additional test line gn.

Consequently, the result of using such an open/short circuit tester and testing method is a decrease in the number of test pads which, in turn, improves test throughput. The reduction in the number of test pads is accomplished by forming additional test lines and switching elements outside of the display active area. By doing so, complete contact between testing pads and testing probe is improved thereby increasing testing reliability.

While the above description provides a full and complete disclosure of the preferred embodiment of the invention, various modifications, alternate constructions and equivalents may be employed as desired. Therefore, the above description and illustrations should not be construed as limiting the invention. I claim all modifications and variations coming within the spirit and scope of the following claims.

What is claimed is:

1. An open/short circuit test circuit for use on a liquid crystal display, comprising:
   a plurality of data lines;
   a plurality of test lines together with the data lines forming a matrix outside an active area of the liquid crystal display; and
   a plurality of test pads connected to a predetermined group of the data lines for measuring a data line variable.

2. An open/short circuit test circuit for use on a liquid crystal display having a plurality of data lines, the test circuit comprising:
   a common pad for receiving a test voltage, said common pad connected to a first end of the plurality of data lines;
   a plurality of test lines, said plurality of test lines and the data lines forming a matrix outside an active area of the liquid crystal display; and
   a plurality of test pads for measuring a data line variable, each test pad connected to a second end of a predetermined group of data lines.

3. The open/short circuit test circuit of claim 2 wherein the data line variable is a current or a resistance.

4. The open/short circuit test circuit of claim 2 further comprising a plurality of control pads, each of said plurality of control pads connected an end of a corresponding test line of said plurality of test lines.

5. The open/short circuit test circuit of claim 4 further comprising a plurality of switching elements, each switching element formed at each intersection in the matrix formed between said plurality of test lines and the plurality of data lines.

6. The open/short circuit test circuit of claim 5 wherein each switching element of said plurality of switching elements is a thin film transistor.

7. A test circuit for identifying open and short circuit defects in a liquid crystal display, the liquid crystal display having an active area where a picture is displayed, the tester comprising:
   a common test pad connected to a first end of a plurality of data lines, the plurality of data lines extending outside of the active area;
   a plurality of control pads each connected to a corresponding test line of a plurality of test lines, the plurality of test lines crossing said plurality of data lines outside the active area; and
   a plurality of test pads for measuring a test parameter, each test pad connected to a second end of a predetermined group of data lines.

8. The test circuit of claim 7 wherein said common test pad supplies a common test voltage to the plurality of data lines.

9. The test circuit of claim 8 further comprising a plurality of switching elements, each switching element coupled to a corresponding data and a corresponding test line.

10. The test circuit of claim 9 wherein each of said plurality of switching elements is a thin film transistor.

11. The test circuit of claim 10 wherein each of said plurality of switching elements includes a gate coupled to a test line, a drain coupled to a data line, and a source coupled to a test pad.

12. The test circuit of claim 9 wherein each of said plurality of control pads enables at least one switching element of said plurality of switching elements responsive to an enable signal.

13. The test circuit of claim 7 wherein the test parameter is a current or a resistance.

14. A method for testing liquid crystal displays having a plurality of data lines and a plurality of test lines forming an array, the method comprising:
   applying a test voltage to a common pad connected to the plurality of data lines;

applying a test voltage to a control pad connected to a first predetermined group of data lines and a corresponding test line; and measuring a test parameter for each data line by probing a test pad connected to a second predetermined group of data lines.

15. The method of claim 14 wherein the common pad is connected to a first end of the plurality of data lines and wherein the test pad is connected to a second end of the second predetermined group of data lines.

16. The method of claim 15 further including connecting a control pad to each of the plurality of test lines.

17. The method of claim 16 wherein the test parameter measured is a current or a resistance.

18. A liquid crystal display having an active area where a picture is displayed, the liquid crystal display comprising;

a plurality of data lines extending outside the active area;

a common test pad connected to a first end of said plurality of data lines;

a plurality of control pads each connected to a corresponding test line of a plurality of test lines, the plurality of test lines intersecting said plurality of data lines outside of the active area; and a plurality of test pads for measuring a current or a resistance, each test pad connected to a second end of at least one of said plurality of data lines.

19. The liquid crystal display of claim 18 further comprising a plurality of transistors, each transistor formed at an intersection of a respective data line of said plurality of data lines and a respective test line of the plurality of test lines.

20. The method of claim 14 wherein applying a test voltage includes enabling at least one switching element from a plurality of switching elements, each switching element being coupled between a respective one of the data and test lines.

21. The liquid crystal display of claim 19 wherein each transistor is a thin film transistor.

* * * * *